United States Patent Office 3,692,584
Patented Sept. 19, 1972

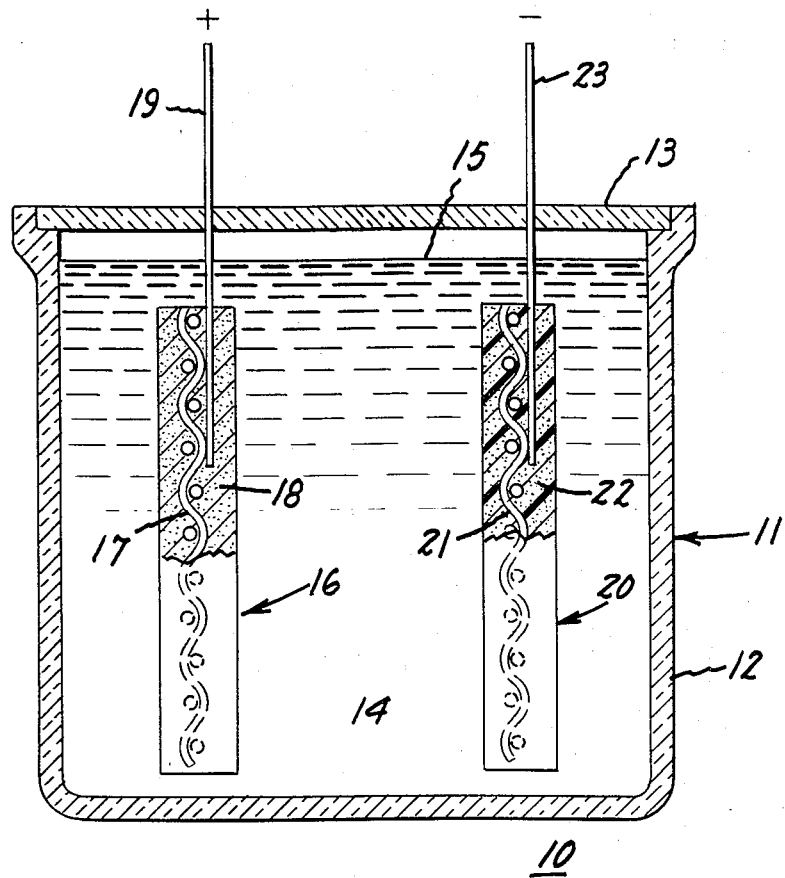

3,692,584
SEALED ELECTROCHEMICAL CELL WITH AN ELECTROLYTIC SOLUTION CONTAINING AN ELECTROLYTE AND A DISSOLVED FUEL
Randall N. King, Johnstown, N.Y., assignor to General Electric Company
Filed Oct. 27, 1969, Ser. No. 869,567
Int. Cl. H01m 11/00
U.S. Cl. 136—83 R
4 Claims

ABSTRACT OF THE DISCLOSURE

A sealed electrochemical cell has a casing, an electrolytic solution containing an electrolyte and a dissolved fuel in the casing, a metallic oxide positive electrode positioned in the electrolytic solution, and a negative electrode positioned in the solution and spaced apart from the positive electrode. An electrode is described which comprises an electrically conductive screen, and a coating of a noble metal and polyethylene graphite thereon. A method of making such an electrode is also described.

---

This invention relates to electrochemical cells, to electrodes therefor, and to methods of making such electrodes, and, more particularly, to sealed electrochemical cells with an electrolytic solution containing an electrolyte and a dissolved fuel, electrodes therefor, and to methods of making such electrodes.

An electrochemical cell, which contains its fuel therein, has an aqueous alkaline electrolyte with a soluble fuel dissolved therein, a negative electrode in contact with the electrolyte that is capable of electrocatalytically oxidizing the fuel, such as an alcohol, a positive electrode which is a porous, gas diffusion electrode thereby forming a gas permeable but leak resistant barrier between the electrolyte and the oxidant, usually air. The positive electrode is provided with a surface which is active for the reduction of the oxidant but is catalytically passive to the alcohol or other fuel. In such cells, serious problems are encountered in leakage or spillage of the corrosive liquid electrolyte from the casing, drowning of the positive electrode by the electrolyte, and evaporation of the fuel, if volatile.

My present invention is directed to an improved electrochemical cell which is sealed, employs an electrolytic solution containing an acid or alkaline electrolyte and dissolved fuel therein, a new negative electrode, and a non-gas diffusion, metallic oxide positive electrode. My invention is further directed to a new electrode which is useable as the negative electrode in the above cell, and to a method of making such an electrode. In my improved electrochemical cell, the above problems of liquid electrolyte leakage or spillage, drowning of the positive electrode, and loss of fuel are eliminated.

It is a primary object of my invention to provide an improved sealed electrochemical cell which eliminates a gas diffusion positive electrode, and leakage or spillage of the liquid electrolyte containing dissolved fuel therefrom.

It is another object of my invention to provide a new electrode useable as an anode in such an electrochemical cell.

It is a further object of my invention to provide an improved method of making such an electrode.

In accordance with one aspect of my invention, an electrochemical cell has a casing, an electrolytic solution containing an electrolyte and a dissolved fuel in the casing, a metallic oxide positive electrode positioned within the casing and immersed at least partially in the electrolytic solution, a negative electrode positioned within the casing and immersed at least partially in the electrolytic solution, the positive electrode and the negative electrode spaced apart from each other.

These and various other objects, features and advantages of the invention will be better understood from the following description taken in connection with the accompanying drawing in which:

The single figure is a vertical, sectional view of an electrochemical cell embodying my invention.

In the single figure of the invention, there is shown generally at 10 an electrochemical cell embodying my invention, which cell has a casing 11 with a body portion 12 having a closed bottom and an open top, and a cover portion 13 fitting tightly over the open top of body portion 12. Casing 11 defines a chamber 14 in which there is provided an electrolytic solution 15 of an aqueous alkali solution such as potassium hydroxide, and a dissolved fuel such as methanol. A metallic oxide positive electrode 16 is positioned within casing and immersed at least partially in the electrolytic solution 15. Electrode 16 is shown as a nickel hydroxide electrode which has an electrically conductive screen 17 with nickel hydroxide powder 18 sintered thereon. An electrically conductive lead 19 is in electrical contact with screen 17 and extends outwardly through an opening in cover portion 13.

A negative electrode 20 is positioned within casing 14, is immersed at least partially in electrolyte solution 15 and is spaced from positive electrode 16. Negative electrode 20 is shown as the new electrode of our invention which comprises an electrically conductive screen 21 with a layer 22 of a noble metal such as palladium black, and polyethylene graphite pressed thereon. An electrically conductive lead 23 is in electrical contact with screen 21 and extends outwardly through an opening in cover portion 13.

I found unexpectedly that a sealed electrochemical cell could be formed by a casing, an electrolytic solution containing an electrolyte and a dissolved fuel in the casing, a metallic oxide positive electrode positioned in the casing and immersed at least partially in the electrolytic solution, and a negative electrode positioned in the casing and immersed at least partially in the electrolytic solution and spaced apart from the positive electrode. I found further that I could eliminate a gas diffusion electrode from the cell and provide a sealed electrochemical cell with the fuel dissolved in the electrolyte providing an electrolytic solution. I found that I could form such an improved electrochemical cell by employing a metallic oxide positive electrode. When an acid electrolyte is used, a lead dioxide electrode is suitable. When an alkaline electrolyte is used, suitable electrodes include nickel hydroxide, mercuric oxide, and manganese dioxide. I prefer to employ as the negative electrode, the new electrode of my invention which comprises an electrically conductive screen, and a coating of a noble metal and polyethylene graphite adhering thereto.

It will be appreciated that the negative electrode can be of any conventional construction or configuration and made of various materials. Negative electrodes capable of efficiently oxidizing alcohol usually include platinum metals or alloys as the electrocatalysts. The electrocatalyst may be employed as a high area coating on a substrate, suitably bonded into a porous mass or supported on a porous substrate of nickel, carbon etc.

I found further that I could form my new negative electrode by mixing together a noble metal or noble metal alloy, for example palladium black and polyethylene graphite which mixture is then pressed on to a nickel collector screen. This electrode structure is then immersed in an aqueous alkaline or acid electrolyte for a period of time during which the electrode gasses violently. Upon completion of the violet gassing the negative electrode is produced. The electrode can be reimmersed in the same or an identical electrolyte with no further gassing.

I found further that in the formation of my improved electrode the degassing step can be accomplished in either an alkaline or acid electrolytic solution after which the electrode can be water washed and employed in either type of electrolyte. Further I found that when such an improved electrode is employed in an electrochemical cell with an appropriate cathode and an electrolytic solution with electrolyte and dissolved fuel that the cell can be sealed. In this manner the previous problems of electrolyte leakage and weepage from a gas-diffusion electrode electrochemical cell are eliminated. The dissolved fuel is contained within the electrolytic solution thereby eliminating any necessity for an opening in the cell to supply fuel to the cell. During cell operation, no further gassing is encountered.

The preferred alkaline electrolyte is potassium hydroxide and the preferred fuel is alcohol. The alkaline electrolyte may be aqueous alkali solution of any desired concentration. While the alkali metal hydroxides are the most commonly employed and of the lowest cost, it is appreciated that other soluble hydroxides may be employed, such as tetra-substituted ammonium or phosphonium hydroxides. Asused herein the term "alcohol" includes methanol, ethanol, n-propanol, and isopropanol— that is, any alcohol having from 1 to 3 carbon atoms. Methanol is a preferred alcohol on the basis of cost and reactivity. Since the alcohols are miscible with water in all proportions, any desired quantity may be utilized. It is preferred, however, that the relation of hydroxyl ions to alcohol be maintained in a molar ratio that insures that all the alcohol will be consumed during extended operation of the unit. Other fuels are also suitable such as hydrazine, formate, ammonia, ethylene glycol, etc.

The preferred acid electrolyte is sulfuric acid in various concentrations. Other acid electrolytes can also be utilized. The preferred fuel is methanol as with the alkaline electrolyte but the other previously mentioned fuels can also be utilized. While various metallic oxide positive electrodes can be employed in my electrochemical cell, I prefer to use a nickel hydroxide electrode with an alkaline electrolyte and to use a lead dioxide electrode with an acid electrolyte.

In an illustrative operation of the electrochemical cell shown in the single figure of the drawing, an electrolytic solution containing an electrolyte of potassium hydroxide and a fuel of methyl alcohol is poured into chamber 14 of casing 11. Cover 13 with the nickel hydroxide positive electrode 16 and my new negative electrode 20 attached is fitted frictionally at the upper open end of body portion 12 and sealed thereto in any suitable manner. Leads 19 and 23 are connected to a suitable electrical load (not shown) and electrical energy is generated from the cell.

Examples of electrochemical cells and electrodes therefor made in accordance with my invention are set forth below:

EXAMPLE 1

An electrode, which was made in accordance with my invention and which will be employed subsequently as the negative electrode in a sealed electrochemical cell, was prepared by mixing together two parts by weight of palladium black to one part of polyethylene graphite. This mixture was then pressed on to an electrically conductive nickel screen at a pressure of 4000 p.s.i. The screen had an electrically conductive lead attached thereto. In this manner the nickel screen had a coating of palladium and polyethylene graphite adhering thereto.

The electrode was then immersed in a 31 weight percent potassium hydroxide solution whereupon there was violent gassing. The electrode was retained within the solution until the gassing ceased. The electrode was then removed from the solution and immersed in a fresh 31 weight percent potassium hydroxide solution to make certain that no further gassing would take place. No gassing occurred. The electrode was then washed in distilled water for several minutes. The electrode had an area of one square inch, was 50 mils thick, and weighed 1½ grams.

EXAMPLE 2

The electrode of Example 1 was attached by means of its electrically conductive lead to the cover portion of an electrochemical cell casing to provide a negative electrode. The opposite end of the lead extended through the cover. A positive electrode, which was of nickel hydroxide with an electrically conductive lead was also fastened to the cover and extended outwardly therefrom. The positive electrode, which had a theoretical capacity of 100 ma. hours by previous electrochemical test was spaced ¼ of an inch from the negative electrode. The body portion of the casing had an electrolytic solution poured therein which solution was prepared by adding 3 cc. of methanol to 25 cc. of 31 weight percent potassium hydroxide. The cover portion was then fitted frictionally to the upper open end of the body portion of the casing after which the cover was sealed to the body portion thereby providing a sealed electrochemical cell. In this manner both of the electrodes were completely immersed in the electrolytic solution. The resulting structure was a sealed electrochemical cell made in accordance with my invention.

EXAMPLE 3

The electrochemical cell from Example 2 was employed to obtain polarization data which is set forth below in Table I wherein voltage in volts was plotted against current density in ma./in.$^2$.

TABLE I

| Voltage—volts: | Current density (ma./in.$^2$) |
|---|---|
| 1.16 | 8 |
| 1.13 | 20 |
| 1.07 | 40 |
| 1.03 | 60 |
| .99 | 80 |
| .96 | 100 |
| .90 | 150 |
| .855 | 200 |
| .81 | 250 |
| .76 | 300 |
| .72 | 350 |
| .67 | 400 |
| .62 | 450 |
| .57 | 500 |

EXAMPLE 4

The electrochemical cell of Example 2 was unsealed, opened and refilled with a different methanol content in that 10 cc. of methanol was added to 25 cc. of 31 weight percent potassium hydroxide solution.. Polarization data was then obtained from the cell which was identical to the data in Table I of Example 3.

EXAMPLE 5

The electrochemical cell of Example 2 was again employed but after the electrolytic solution was changed to 3 cc. of ethanol in 25 cc. of the same electrolyte. The polarization data was identical to the data set forth above in Table I of Example 3.

EXAMPLE 6

The electrochemical cell of Example 2, which was filled with an electrolytic solution of 3 cc. of methanol and 25 cc. of the same electrolyte was discharged under constant load for 90 minutes at 30 ma. and had 1.02 volts. At the end of this time the nickel electrode was discharged as indicated by a reference electrode measuring system. The nickel hydroxide electrode was then recharged using a conventional cadmium counter electrode. After this charging period, polarization tests were then run and the data obtained was similar to the data set forth above in Table I of Example 3. The above electrochemical cell was employed as set forth in Examples 3 through 6 without any indication of anode fading.

EXAMPLE 7

The above electrochemical cell from Example 3 was disassembled and the interior including the electrodes washed with distilled water. The nickel hydroxide positive electrode was then removed and a lead dioxide electrode having an area of one square inch was substituted for the nickel hydroxide positive electrode. The positive electrode was spaced ¼ of an inch from the negative electrode and supported by its electrical lead through the cover portion of the casing. An electrolytic solution was prepared and added to the body portion of the casing which solution comprises 25 cc. of 1 N sulfuric acid and 3 cc. of methanol. The cell was closed and sealed again. Polarization tests were run in the same manner as in Example 3 and the results are set forth below in Table II.

TABLE II

| Voltage—volts: | Current density (ma./in.$^2$) |
|---|---|
| 1.5 | 50 |
| 1.48 | 100 |
| 1.42 | 200 |
| 1.36 | 300 |
| 1.28 | 400 |
| 1.20 | 500 |

EXAMPLE 8

The electrochemical cell of Example 7 was employed again. The cell was discharged under a constant load of 100 ma. at 1.25 volts for 90 minutes. After this time period, the voltage started to drop rapidly at which point the lead dioxide electrode was recharged. After recharging, polarization tests again were rerun in which the data was slightly higher than the original data set forth in Table II.

EXAMPLE 9

The cell of Example 7 had its electrolytic solution replaced with 10 cc. of ethanol and 25 cc. of 1 N sulfuric acid. Polarization tests run on this cell resulted in data identical to that set forth above in Table II.

While other modifications of the invention and variations thereof which may be employed within the scope of the invention have not been described, the invention is intended to include such as may be embraced within the following claims.

What I claim as new and desire to secure by Letters Patent of the United States is:

1. A sealed electrochemical cell comprising a casing, an electrolytic solution containing an electrolyte and a dissolved fuel in the casing, a metallic oxide positive electrode positioned within the casing and immersed at least partially in the electrolytic solution, a negative electrode positioned within the casing and immersed at least partially in the electrolytic solution, and the positive electrode and the negative electrode spaced apart from each other.

2. A sealed electrochemical cell as in claim 1, wherein the negative electrode comprises an electrically conductive screen, and a coating of a noble metal and polyethylene graphite adhering thereto.

3. A sealed electrochemical cell as in claim 1, wherein the positive electrode is a nickel hydroxide electrode, the electrolyte is potassium hydroxide, and the fuel is alcohol.

4. A sealed electrochemical cell as in claim 1, wherein the positive electrode is a lead dioxide electrode, the electrolyte is sulfuric acid, and the fuel is alcohol.

References Cited

UNITED STATES PATENTS

| 3,416,965 | 12/1968 | Boies et al. | 136—86 |
| 3,248,267 | 4/1966 | Langer et al. | 136—86 |
| 2,925,454 | 2/1960 | Justi et al. | 136—86 |
| 3,297,487 | 1/1967 | Pomeroy et al. | 136—86 |
| 2,901,523 | 8/1959 | Justi et al. | 136—86 |
| 3,207,682 | 9/1965 | Oswin et al. | 136—86 X |
| 3,336,423 | 8/1967 | Le Clair et al. | 136—86 X |

ANTHONY SKAPARS, Primary Examiner

U.S. Cl. X.R.

136—154